United States Patent
Go et al.

(10) Patent No.: US 11,322,963 B2
(45) Date of Patent: May 3, 2022

(54) CONTROL METHOD FOR POWER SUPPLY

(71) Applicant: SAMSUNG SDI CO., LTD., Yongin-si (KR)

(72) Inventors: Hyunseok Go, Yongin-si (KR);
Hyunah Park, Yongin-si (KR);
Hyunchul Do, Yongin-si (KR);
Daesung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/937,934

(22) Filed: Jul. 24, 2020

(65) Prior Publication Data

US 2021/0028640 A1 Jan. 28, 2021

(30) Foreign Application Priority Data

Jul. 25, 2019 (KR) .................. 10-2019-0090489

(51) Int. Cl.
*H02J 7/00* (2006.01)
*H02J 7/34* (2006.01)

(52) U.S. Cl.
CPC .......... *H02J 7/0068* (2013.01); *H02J 7/0048* (2020.01); *H02J 7/345* (2013.01)

(58) Field of Classification Search
CPC ...... B60L 2270/20; B60L 50/51; B60L 58/10; B60L 50/60; H02J 7/0069; H02J 2207/50; H02J 7/0063; H02J 7/007182; H02J 7/00302; H02J 7/00304; H02J 7/0048; H02J 7/0068; H02J 7/345; G01R 27/2605; Y02T 10/70
See application file for complete search history.

(56) References Cited

U.S. PATENT DOCUMENTS

| | | | |
|---|---|---|---|
| 6,040,722 A | 3/2000 | Lee | |
| 7,327,053 B2* | 2/2008 | Eckardt | H03K 17/687 307/126 |
| 9,316,697 B2 | 4/2016 | Oh et al. | |

(Continued)

FOREIGN PATENT DOCUMENTS

| | | |
|---|---|---|
| DE | 10-2016-109866 A1 | 11/2017 |
| EP | 2368749 A2 | 9/2011 |

(Continued)

OTHER PUBLICATIONS

European Search Report dated Dec. 18, 2020.

*Primary Examiner* — Helen Rossoshek
(74) *Attorney, Agent, or Firm* — Lee IP Law, PC (57) ABSTRACT

A control method for a power supply, in which a link capacitor is connected between an external load and a power relay assembly (PRA) that includes a precharge resistor to control a power flow between a battery and the external load, the control method including: initiating precharge; after the initiating of the precharge, measuring voltages of the link capacitor by measuring a first voltage V1 of the link capacitor at a first time T1, measuring a second voltage V2 of the link capacitor at a second time T2, and measuring a third voltage V3 of the link capacitor at a third time T3, the first time T1, the second time T2, and the third time T3 each being different times; calculating a capacitance C of the link capacitor using the first voltage V1, the second voltage V2, and the third voltage V3; and terminating the precharge.

13 Claims, 4 Drawing Sheets

(56) References Cited

U.S. PATENT DOCUMENTS

| | | |
|---|---|---|
| 10,250,047 B2 | 4/2019 | Kang |
| 2011/0234177 A1 | 9/2011 | Kohara et al. |
| 2012/0025768 A1 | 2/2012 | Nakano et al. |
| 2014/0028088 A1* | 1/2014 | Salziger ............. G01R 27/2605 307/9.1 |
| 2014/0029308 A1* | 1/2014 | Cojocaru ................. H01G 9/28 363/13 |
| 2015/0251542 A1 | 9/2015 | Mensah-Brown et al. |
| 2017/0166065 A1 | 6/2017 | Hong et al. |
| 2018/0043783 A1 | 2/2018 | Tabatowski-Bush et al. |
| 2018/0272870 A1 | 9/2018 | Burkman et al. |
| 2019/0187211 A1* | 6/2019 | Muller ................... G01R 31/54 |
| 2020/0274375 A1* | 8/2020 | Griffiths ................ H02J 7/1423 |
| 2021/0167709 A1* | 6/2021 | Zhou ......................... H02P 6/10 |
| 2021/0249979 A1* | 8/2021 | Dinu .................... H03H 7/0115 |

FOREIGN PATENT DOCUMENTS

| | | | |
|---|---|---|---|
| EP | 2413453 A2 | 2/2012 | |
| EP | 2822132 A1 | 1/2015 | |
| EP | 3121056 A1 | 1/2017 | |
| JP | 2007242247 A * | 9/2007 | ............... B60L 3/00 |
| JP | 5835009 B2 * | 12/2015 | ............. B60L 53/11 |
| JP | 2020-524472 A * | 8/2020 | ......... H02J 7/00304 |
| KR | 1998-082198 A | 12/1998 | |
| KR | 10-1171584 B1 | 8/2012 | |
| KR | 10-1852322 B1 | 4/2018 | |
| KR | 20180068370 A * | 6/2018 | ................ H02J 7/00 |

\* cited by examiner

CONTROL METHOD FOR POWER SUPPLY

CROSS-REFERENCE TO RELATED APPLICATION

Korean Patent Application No. 10-2019-0090489, filed on Jul. 25, 2019, in the Korean Intellectual Property Office, and entitled: "Control Method for Power Supply," is incorporated by reference herein in its entirety.

BACKGROUND

1. Field

Embodiments relate to a control method for a power supply.

2. Description of the Related Art

Power supplies, which are used as energy sources of mobile devices, electric vehicles, hybrid vehicles, electric bicycles, or uninterruptible power supplies, may include secondary batteries that can be repeatedly charged and discharged unlike primary batteries that cannot be recharged. Such a power supply may include only a single battery or a battery module in which a plurality of batteries are connected to each other as a unit according to the types of external devices to which the power supply is applied.

Unlike small mobile devices such as cellular phones each operable for a certain period of time using a single battery, devices such as electric vehicles or hybrid vehicles having long operation times and consuming large amounts of electricity may use battery modules each including a plurality of batteries to handle problems relating to power and capacity, and the output voltages or currents of power supplies may be increased by adjusting the number of batteries included in each power supply.

SUMMARY

Embodiments are directed to a control method for a power supply, in which a link capacitor may be connected between an external load and a power relay assembly (PRA) that includes a precharge resistor to control a power flow between a battery and the external load, the control method including: initiating precharge; after the initiating of the precharge, measuring voltages of the link capacitor by measuring a first voltage V1 of the link capacitor at a first time T1, measuring a second voltage V2 of the link capacitor at a second time T2, and measuring a third voltage V3 of the link capacitor at a third time T3, the first time T1, the second time T2, and the third time T3 each being different times; calculating a capacitance C of the link capacitor using the first voltage V1, the second voltage V2, and the third voltage V3; and terminating the precharge.

The second time T2 and the third time T3 may be sequential times selected with preset time intervals Δt from the first time T1.

The measuring of the first voltage V1, the second voltage V2, and the third voltage V3 may include: after the initiating of the precharge, measuring the first voltage V1 at the first time T1; measuring the second voltage V2 at the second time T2 after a preset time interval Δt from the first time T1; and measuring the third voltage V2 at the third time T2 after the preset time interval Δt from the second time T2.

In the calculating of the capacitance C of the link capacitor, a control unit may calculate the capacitance C of the link capacitor by using a voltage rise ratio X defined as a ratio of sequential voltage differences between the first voltage V1, the second voltage V2, and the third voltage V3.

The voltage rise ratio X may be calculated by the following equation:

$$X = \frac{(V3 - V2)}{(V2 - V1)}$$

The capacitance C of the link capacitor may be calculated by inputting the voltage rise ratio X, resistance R of the precharge resistor, and a preset time interval Δt into the following equation:

$$C = -\frac{\Delta t}{(R \times \ln X)}$$

The PRA may include: a first main relay connected to a negative terminal of the battery; a second main relay connected to a positive terminal of the battery; and a precharge relay connected in parallel to the second main relay and in series to the precharge resistor.

In the initiating of the precharge, a control unit may output a relay control signal to turn on the precharge relay.

In the initiating of the precharge, the control unit may output a relay control signal to turn on the first main relay before turning on the precharge relay.

In the terminating of the precharge, a control unit may output a relay control signal to turn on the second main relay.

In the terminating of the precharge, the control unit may output a relay control signal to turn off the precharge relay after turning on the second main relay.

Main charge may be performed simultaneously with the terminating of the precharge by bypassing the precharge resistor.

After the measuring of the first voltage V1, the second voltage V2, and the third voltage V3, the control method may further include: measuring a voltage of the link capacitor and a voltage of the battery; and determining a termination time of the precharge by comparing the measured voltage of the link capacitor with the measured voltage of the battery.

In the determining of the termination time of the precharge, transition to the terminating of the precharge may be performed at a time when the measured voltage of the link capacitor may be equal to or greater than about 95% to about 97% of the measured voltage of the battery.

The measuring of the first voltage V1, the second voltage V2, and the third voltage V3 may be performed between the initiating of the precharge and the terminating of the precharge.

A control unit may determine a replacement time of the link capacitor by detecting a capacitance decrease of the link capacitor, which occurs with time of use, from the calculated capacitance C of the link capacitor.

The control unit may determine, as the replacement time of the link capacitor, a time when the calculated capacitance C of the link capacitor falls below a preset percentage of an initial capacitance of the link capacitor, and the control unit may generate an alarm corresponding to the replacement time.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Throughout the disclosure, the expression "at least one of a, b, or c" indicates only a, only b, only c, both a and b, both a and c, both b and c, all of a, b, and c, or variations thereof.

Hereinafter, a control method for a power supply will be described according to example embodiments with reference to the accompanying drawings.

Figure 1:
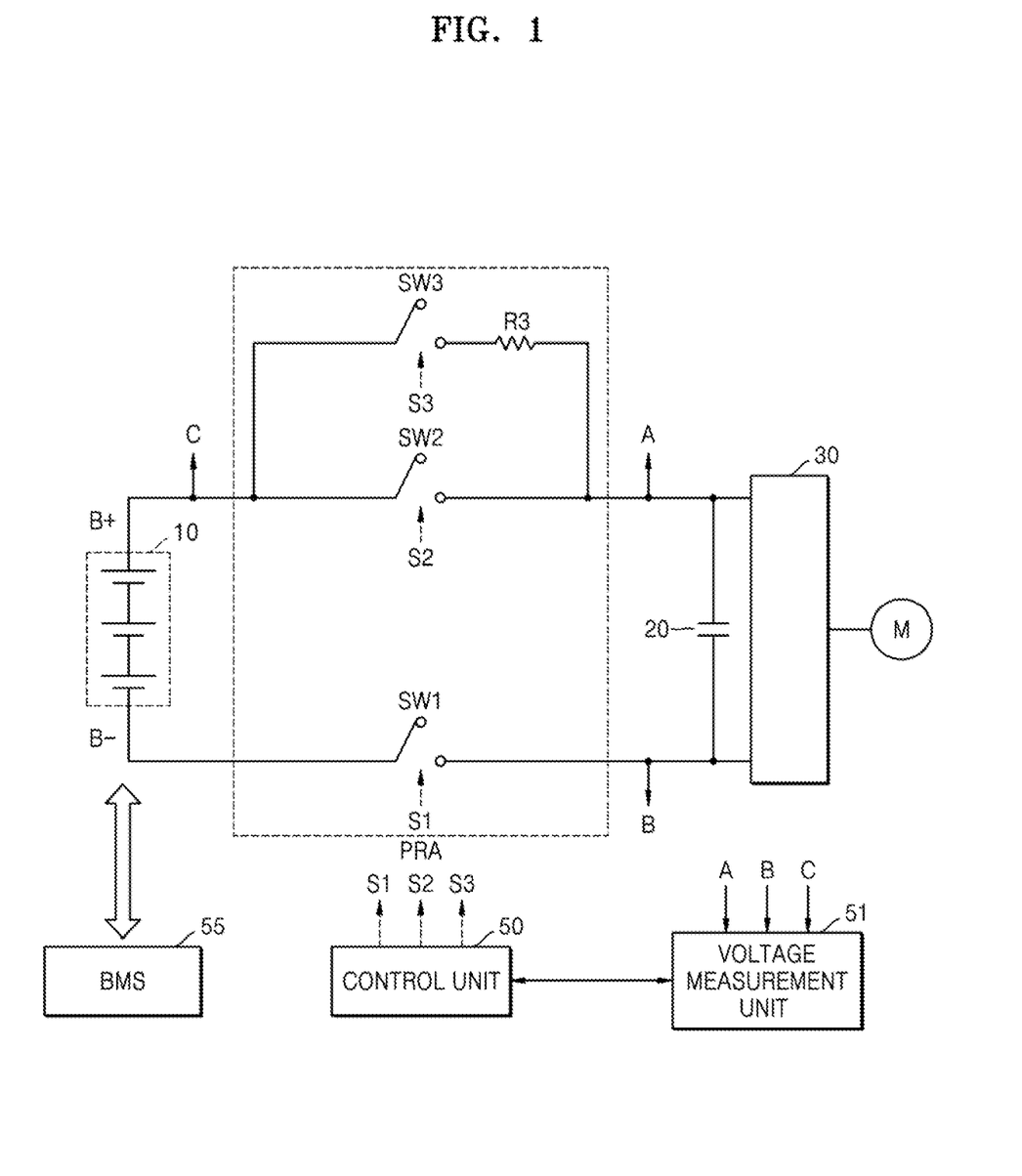
FIG. 1 is a view schematically illustrating a power supply which is applicable to an embodiment.

FIG. 1 is a view schematically illustrating a power supply which is applicable to an embodiment.

Referring to FIG. 1, the power supply may include: a battery 10 configured to supply stored electricity as driving power to an external load 30; a power relay assembly (PRA) provided between the battery 10 and the external load 30 and configured to perform turn-on/turn-off control for power flow from the battery 10; and a link capacitor 20 connected between the PRA and the external load 30. In addition, the power supply may include a control unit 50 configured to output relay control signals S1, S2, and S3 to the PRA.

The battery 10 may include a plurality of battery cells electrically connected to each other and may provide high-voltage driving power to the external load 30. For example, the external load 30 may be a power conversion device of an electric vehicle, and the battery 10 may provide high-voltage power at a voltage level of about 200 V to about 500 V.

The PRA may include a plurality of relays such as a first main relay SW1, a second main relay SW2, and a precharge relay SW3. The PRA may further include a precharge resistor R3 connected in series to the precharge relay SW3.

The first main relay SW1 may be connected to a negative terminal B− of the battery 10, and the second main relay SW2 may be connected to a positive terminal B+ of the battery 10. The battery 10 and the external load 30 may be connected to each other through the first and second main relays SW1 and SW2. The precharge relay SW3 may be connected in parallel to the second main relay SW2 and may provide a path bypassing the second main relay SW2. According to an example embodiment, when power is supplied from the battery 10 to the external load 30, the precharge relay SW3 and the second main relay SW2 may be sequentially operated, and before power is supplied from the battery 10 through the second main relay SW2, power may be supplied from the battery 10 through the precharge resistor R3 such that the occurrence of an overcurrent or inrush current may be prevented in the initial stage of discharge of the battery 10.

According to an example embodiment, the control unit 50 may sequentially control the relays of the PRA such as the first main relay SW1, the second main relay SW2, and the precharge relay SW3 by first turning on the precharge relay SW3 and then turning on the second main relay SW2 after the link capacitor 20 is sufficiently charged, such that power may be supplied from the battery 10 through the precharge resistor R3 in the initial stage of discharge of the battery 10 to prevent the occurrence of an overcurrent or inrush current and the occurrence of arcs at the time the second main relay SW2 is turned on.

For example, when an ignition key of an electric vehicle is turned on, the control unit 50 may output relay control signals S1 and S3 to the PRA to turn on (i.e., to make a conductive path) the precharge relay SW3 and the first main relay SW1. At this time, the power of the battery 10 may flow through the precharge relay SW3 connected to the positive terminal B+ of the battery 10 and the first main relay SW1 connected to the negative terminal B− of the battery 10, and the battery 10 and the external load 30 may be connected to each other through the precharge relay SW3 and the first main relay SW1. At this time, power may be supplied from the battery 10 to the external load 30 with a voltage drop at the precharge resistor R3, and the link capacitor 20 may start to be charged. As described above, since power is supplied from the battery 10 through the precharge resistor R3 in the initial stage of discharge of the battery 10, the occurrence of an overcurrent or inrush current may be prevented, and when the second main relay SW2 is turned on, the occurrence of arcs may be prevented.

When the link capacitor 20 is sufficiently charged, the control unit 50 may output a relay control signal S2 to turn on the second main relay SW2. At this time, the battery 10 and the external load 30 may be connected through the first and second main relays SW1, SW2, and when the second main relay SW2 is turned on, the power of the battery 10 which has flowed through the precharge relay SW3 may flow through the second main relay SW2 having relatively low resistance. After the second main relay SW2 is turned on, the control unit 50 may output a relay control signal S3 to turn off the precharge relay SW3.

The power supply may further include a battery management system (BMS) 55. The BMS 55 may have a function of monitoring the state of the battery 10 to estimate the state of charge (SOC) and the state of health (SOH) of the battery 10 using results of the monitoring, a function of performing a balancing operation to resolve unbalanced charge/discharge states of the battery cells of the battery 10, and a function of performing a protection operation for the battery 10 in case of malfunctions such as overvoltage, overcurrent, or overheating. The BMS 55 may be provided separately from the control unit 50, which controls the operations of the relays of the PRA such as the first main relay SW1, the second main relay SW2, and the precharge relay SW3, or the control unit 50 may have a function of controlling the operations of the relays of the PRA and also a function of controlling the charge/discharge operation of the battery 10 like the BMS 55.

The power supply may further include a voltage measurement unit 51. The voltage measurement unit 51 may measure the voltage of the link capacitor 20 and the voltage of the battery 10 using measurement terminals A, B, and C which are connected between the battery 10 and the external load 30. For example, the voltage measurement unit 51 may measure the voltage of the link capacitor 20 at different times during precharge, and may transmit measured voltage information to the control unit 50. The control unit 50 may calculate the capacitance of the link capacitor 20 from the voltage of the link capacitor 20 measured by the voltage measurement unit 51. The calculation of the capacitance of the link capacitor 20 will be described below.

According to an example embodiment, during precharge, to determine whether or not to terminate the precharge, the voltage measurement unit 51 may measure the voltage of the link capacitor 20 and the voltage of the battery 10 and may transmit the measured voltage information to the control unit 50. The control unit 50 may determine the termination time of precharge by comparing the voltage of the link capacitor 20 and the voltage of the battery 10 obtained from the voltage measurement unit 51. In this case, the control unit 50 may determine the termination time of precharge based on voltage information measured in real time and may terminate the precharge by turning on the second main relay SW2.

In an example embodiment, the control unit 50 may terminate precharge when the voltage of the link capacitor 20 is equal to or greater than about 95% to about 97% of the voltage of the battery 10. For example, when precharge is initiated by turning on the precharge relay SW3, the voltage of the link capacitor 20 approaches the voltage of the battery 10, and when the voltage of the link capacitor 20 is equal to or greater than about 95% to about 97% of the voltage of the battery 10, the control unit 50 may terminate the precharge by turning on the second main relay SW2. In this case, since the link capacitor 20 is sufficiently charged to a voltage level equal to or greater than about 95% to about 97% of the voltage of the battery 10 at the termination time of the precharge, although the second main relay SW2 is turned on to perform main charge by bypassing the precharge resistor R3, the occurrence of an overcurrent or inrush current may be prevented, and variations in the voltage of the link capacitor 20 may be reduced. In an example embodiment, precharge may be terminated when the voltage of the link capacitor 20 is equal to or greater than about 97% of the voltage of the battery 10, and at this time, the second main relay SW2 may be turned on.

The external load 30 may be a power conversion device provided in an electric vehicle to convert the power of the battery 10 into power having another level, and for example, the external load 30 may be an inverter configured to convert the DC power of the battery 10 into three-phase AC power for operating a drive motor M of the electric vehicle. As another example, the external load 30 may correspond to a motor control unit MCU configured to control the drive motor M of the electric vehicle. Herein, the term "external load" encompasses electric vehicles and any other devices capable of receiving power from the battery 10 as driving power.

The link capacitor 20 may be connected in parallel to the external load 30. The link capacitor 20 may have a power rectification function from the point of view of the external load 30, a function of coping with sudden power variation state of the external load 30 from the point of view of the battery 10, and a buffer function between the battery 10 and the external load 30 while being charged and discharged. The link capacitor 20 may be physically provided in the battery 10 or the external load 30 such as a power conversion device (for example, an inverter), and even in this case, the link capacitor 20 may be considered as an element of the power supply in a system including the battery 10 and the external load 30.

An electrolytic capacitor may be used, for example, as the link capacitor 20. The electrolytic capacitor may undergo changes such as evaporation of an electrolyte due to deterioration and a temperature increase over the time of use. Thus, a determination as to the condition of the link capacitor 20 may be made in advance of the replacement time of the link capacitor 20 as it ages with time. The control unit 50 may determine the degree of aging of the link capacitor 20 by calculating the capacitance of the link capacitor 20 and detecting a decrease in the capacitance of the link capacitor 20, and may provide information about the replacement time of the link capacitor 20. Calculation of the capacitance of the link capacitor 20 will be described below.

Figure 2:
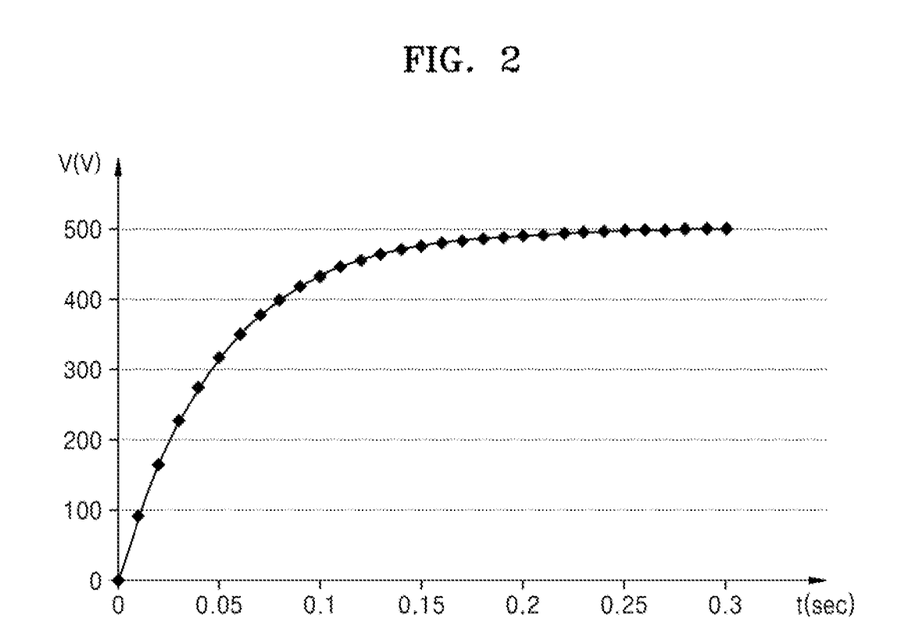
FIG. 2 is a voltage profile graph illustrating an increase in the voltage of a link capacitor after the initiation of precharge.
Figure 3:
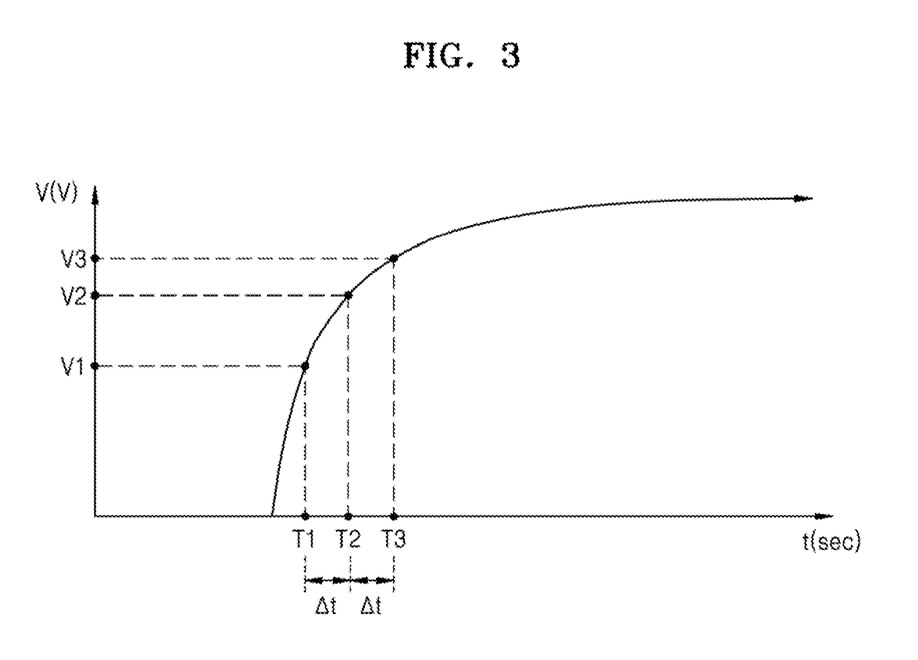
FIG. 3 is a graph illustrating voltage measurements for calculating the capacitance of the link capacitor.

FIG. 2 is a voltage profile graph illustrating an increase in the voltage of the link capacitor 20 after the initiation of precharge. FIG. 3 is a graph illustrating voltage measurements for calculating the capacitance of the link capacitor 20.

According to an example embodiment, as the precharge relay SW3 is turned on, precharge is initiated to charge the link capacitor 20. The voltage of the link capacitor may be measured by detecting a potential difference between terminals A and B. Before measuring the voltage of the link capacitor (V1 at time T1), the first main switch SW 1 may be turned on. The control unit 50 may measure first, second, and third voltages V1, V2, V3 of the link capacitor 20 at different first, second, and third times T1, T2, and T3 within a precharge time period between the initiation and the termination of precharge, and may calculate the capacitance of the link capacitor 20 based on the first voltage V1, the second voltage V2, and the third voltage V3 measured at different times, i.e., at the first time T1, the second time T2, and the third time T3. Thus, in an example embodiment, the power of the battery 10 may be gradually supplied through a delay circuit including the precharge resistor R3 to prevent the occurrence of an overcurrent or inrush current in the initial stage of discharge of the battery 10, and along with this, the capacitance of the link capacitor 20 may be calculated using resistor-capacitor (RC) delay by the resistor R3 and the link capacitor 20 to provide information about the replacement time of the link capacitor 20. The capacitance of the link capacitor 20 may provide information about the degree of aging of the link capacitor 20 and information about the replacement time of the link capacitor 20, and whether to replace the link capacitor 20 may be determined by detecting a decrease in the capacitance of the link capacitor 20 over time, for example, by comparing a calculated capacitance of the link capacitor 20 with the initial capacitance of the link capacitor 20. For example, the control unit 50 may calculate the capacitance of the link capacitor 20, determine the time at which the calculated capacitance of the link capacitor 20 falls below a preset percentage of the initial capacitance of the link capacitor 20 as the replacement time of the link capacitor 20, and provide a user with an alarm corresponding to the replacement time.

According to an example embodiment, the control unit 50 may calculate the capacitance of the link capacitor 20 by measuring the first, second, and third voltages V1, V2, and V3 of the link capacitor 20 within a precharge time period at the first time T1, the second time T2, and the third time T3 (which times may be sequential with a preset time interval Δt therebetween) and calculating the capacitance of the link capacitor 20 using the first voltage V1, the second voltage V2, and the third voltage V3 respectively measured at the first time T1, the second time T2, and the third time T3. Thus, the control unit 50 may calculate the capacitance of the link capacitor 20 using Equation 1 below from the first voltage V1 which is measured at the first time T1, the second voltage V2 which is measured at the second time T2 after the preset time interval Δt from the first time T1, and the third voltage V3 which is measured at the third time T3 after the preset time interval Δt from the second time T2.

$$C = -\frac{\Delta t}{(R \times \ln X)} \quad \text{[Equation 1]}$$

In Equation 1, C refers to the capacitance of the link capacitor 20, Δt refers to the preset time interval, and R refers to the resistance of the precharge resistor R3. In Equation 1, X refers to the ratio of sequential voltage differences between first, second, and third voltages V1, V2, and V3. X may be referred to as a voltage rise ratio. The voltage rise ratio X may be defined by Equation 2 below.

$$X = \frac{(V3 - V2)}{(V2 - V1)} \quad \text{[Equation 2]}$$

In Equation 2 above, V1, V2, and V3 respectively refer to the first, second, and third voltages V1, V2, and V3 of the link capacitor 20 measured at the different first, second, and third times T1, T2, and T3.

According to an example embodiment, when the precharge of the link capacitor 20 is initiated, the increase of the voltage of the link capacitor 20 to a final voltage Vf is delayed according to a time constant RC determined by the resistance R of the precharge resistor R3 and the capacitance C of the link capacitor 20, and the voltage of the link capacitor 20 increases from an initial voltage Vi to the final voltage Vf. The voltage V of the link capacitor 20 may be expressed by Equation 3 below.

$$V = Vf + (Vi - Vf)e^{-\frac{t}{RC}} \quad \text{[Equation 3]}$$

The voltage rise ratio X defined by Equation 2 may be expressed by Equation 4 below by using the voltage V of the link capacitor 20 expressed by Equation 3.

$$X = \quad \text{[Equation 4]}$$
$$\frac{(V3 - V2)}{(V2 - V1)} = \frac{\left(Vf + (Vi - Vf)e^{-\frac{T3}{RC}}\right) - \left(Vf + (Vi - Vf)e^{-\frac{T2}{RC}}\right)}{\left(Vf + (Vi - Vf)e^{-\frac{T2}{RC}}\right) - \left(Vf + (Vi - Vf)e^{-\frac{T1}{RC}}\right)}$$

In Equation 4 above, V1, V2, and V3 are the first, second, and third voltages V1, V2, and V3 respectively measured at first, second, and third times T1, T2, and T3 (which are sequential and have a preset time interval Δt therebetween). The first time T1, the second time T2, and the third time T3 may be related as expressed by Equation 5 below.

$$T2 = T1 + \Delta t$$

$$T3 = T2 + \Delta t = T1 + 2\Delta t \quad \text{[Equation 5]}$$

A functional relationship regarding the capacitance C of the link capacitor 20 expressed by Equation 1 may be obtained using Equation 4 and Equation 5. According to an example embodiment, as described above, the control unit 50 may calculate the capacitance C of the link capacitor 20 using the functional relationship of Equation 1 using the first voltage V1, the second voltage V2, and the third voltage V3 of the link capacitor 20 measured respectively at the first time T1, the second time T2, and the third time T3, which are sequential and have an preset time interval Δt therebetween.

In an example embodiment, the functional relationship for calculating the capacitance C of the link capacitor 20 may be simplified by using the first, second, and third voltages V1, V2, and V3 measured at the first, second, and third times T1, T2, and T3, which are sequential with a preset time interval Δt therebetween (refer to Equation 1). Thus, since the first voltage V1, the second voltage V2, and the third voltage V3 measured at the first time T1, the second time T2, and the third time T3 (which are sequential with a preset time interval Δt therebetween) are used instead of using voltages measured at different arbitrary times, the capacitance C of the link capacitor 20 may be calculated using the simple functional relationship, and thus the computational burden on the control unit 50 may be reduced.

In an example embodiment, the functional relationship for calculating the capacitance C of the link capacitor 20 may be simplified by introducing a parameter that is the voltage rise ratio X, which is defined as the ratio of sequential voltage differences between the first, second, and third voltages V1, V2, and V3 measured at the first, second, and third times T1, T2, and T3, instead of directly using the first voltage V1, the second voltage V2, and the third voltage V3. As expressed by Equation 3, according to an example embodiment, the increase of the voltage V of the link capacitor 20 to the final voltage Vf is delayed according to the time constant RC determined by the resistance R of the precharge resistor R3 and the capacitance C of the link capacitor 20, and the voltage V of the link capacitor 20 increases from the initial voltage Vi to the final voltage Vf. In this case, the variables Vi and Vf may be removed from Equation 4 by introducing the voltage rise ratio X, which is defined as the ratio of sequential voltage differences between the first, second, and third voltages V1, V2, and V3 measured at the different first, second, and third times T1, T2, and T3, instead of directly using the first voltage V1, the second voltage V2, and the third voltage V3. Thus, in an example embodiment, the capacitance C of the link capacitor 20 may be calculated using only first, second, and third voltages V1, V2, and V3 measured at the different first, second, and third times T1, T2, and T3 without having to find the initial voltage Vi and the final voltage Vf of the link capacitor 20.

Figure 4A:
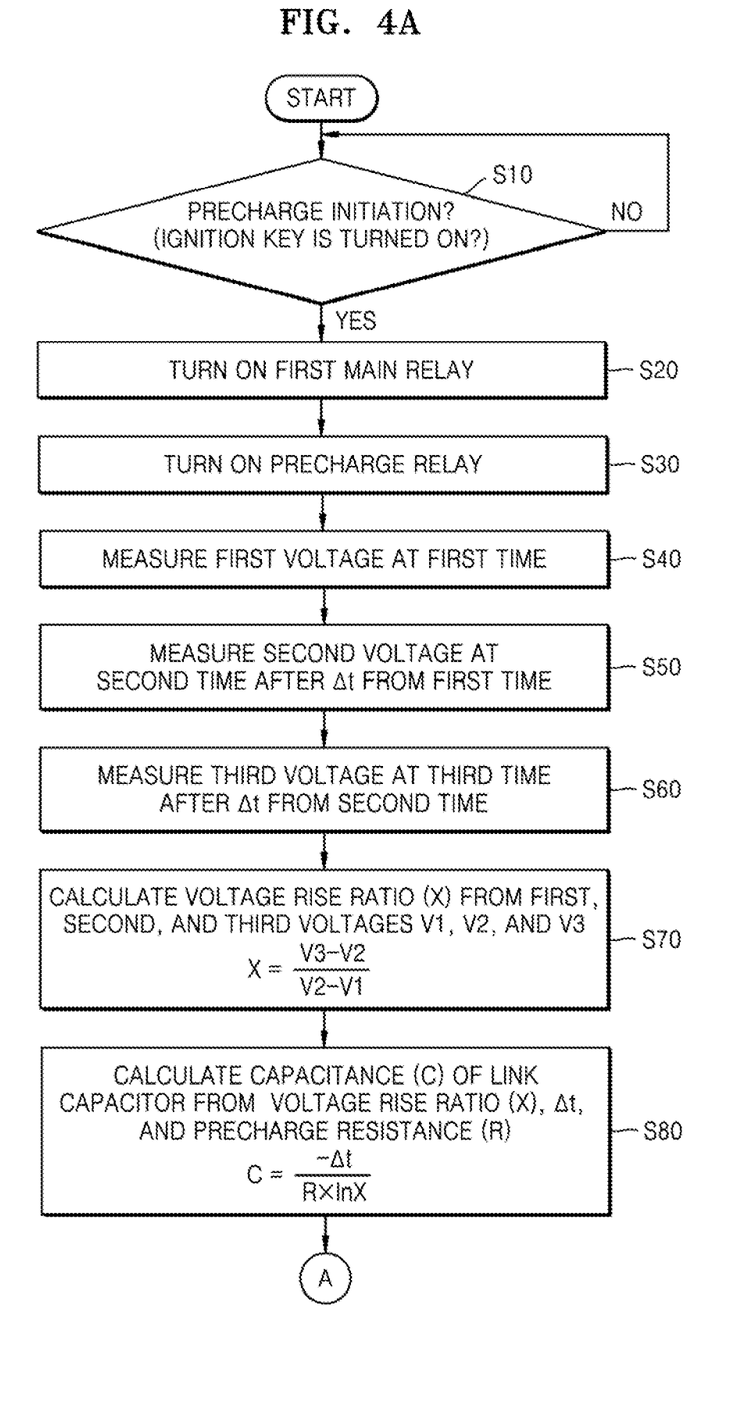
FIGS. 4A and 4B are flowcharts of operations that a control unit performs by a control method for a power supply according to example embodiments.
Figure 4B:
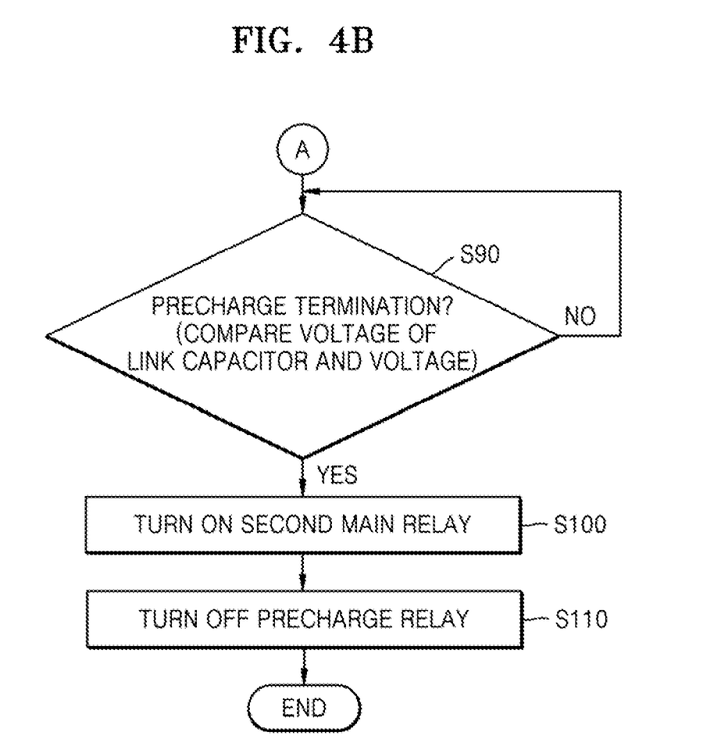

FIGS. 4A and 4B are flowcharts of operations that the control unit 50 performs by a control method for the power supply according to an example embodiment.

Referring to FIGS. 4A and 4B, first, the control unit 50 determines whether a precharge initiation condition is satisfied (S10). For example, when an ignition key of an electric vehicle is turned on, the control unit 50 may initiate precharge according to conditions previously input for the initiation of precharge. Thus, when the ignition key of the electric vehicle is turned on, the control unit 50 may output relay control signals S1 and S3 to the PRA to turn on the first main relay SW1 connected to the negative terminal B− of the battery 10 (S20) and then turn on the precharge relay SW3 connected to the positive terminal B+ of the battery 10 (S30). Then, the power of the battery 10 may flow through the precharge relay SW3 and the first main relay SW1, and as the battery 10 and the external load 30 are connected to each other through the precharge relay SW3 and the first main relay SW1, precharge may be initiated. At this time, power may be supplied from the battery 10 to the external load 30 with a voltage drop at the precharge resistor R3, and the link capacitor 20 may start to be charged.

After the initiation of precharge, the control unit 50 measures the voltage of the link capacitor 20 at different times. Thus, the control unit 50 measures a first voltage V1 at a first time T1 after the initiation of precharge (S40), and a second voltage V2 at a second time T2 after a preset time interval Δt from the first time T1 (S50). Then, the control unit 50 successively measures a third voltage V3 at a third time T3 after the preset time interval Δt from the second time T2 (S60).

After measuring the first voltage V1, the second voltage V2, and the third voltage V3 at the first time T1, the second time T2, and the third time T3, respectively, the control unit 50 calculates a voltage rise ratio X from the first voltage V1, the second voltage V2, and the third voltage V3 by using a functional relationship expressed by Equation 6 below (S70).

$$X = \frac{(V3 - V2)}{(V2 - V1)} \quad \text{[Equation 6]}$$

After calculating the voltage rise ratio X, the control unit 50 calculates the capacitance C of the link capacitor 20 from the voltage rise ratio X, the preset time interval Δt, and the resistance R of the precharge resistor R3 using a functional relationship expressed by Equation 7 below (S80).

$$C = -\frac{\Delta t}{(R \times \ln X)} \quad \text{[Equation 7]}$$

After calculating the capacitance C of the link capacitor 20, the control unit 50 determines whether a precharge termination condition is satisfied (S90). For example, the control unit 50 may determine the termination time of precharge by measuring the voltage of the link capacitor 20 and the voltage of the battery 10 and comparing the measured voltage of the link capacitor 20 and the measured voltage of the battery 10. For example, according to a preset condition for the termination of precharge, the control unit 50 may determine, as the termination time of precharge, the time when the voltage of the link capacitor 20 is equal to or greater than about 95% to about 97% of the voltage of the battery 10.

The control unit 50 may turn on the second main relay SW2 at the termination time of precharge (S100). When the second main relay SW2 is turned on, the power of the battery 10 that has flowed through the precharge relay SW3 flows through the second main relay SW2 having relatively low resistance, and thus the precharge may be terminated. At this time, the power of the battery 10 flows through the second main relay SW2 connected to the positive terminal B+ of the battery 10 and the first main relay SW1 connected to the negative terminal B− of the battery 10, and as the battery 10 and the external load 30 are connected to each other through the second main relay SW2 and the first main relay SW1, main charge may be initiated. After the second main relay SW2 is turned on, the control unit 50 may output a relay control signal S3 to turn off the precharge relay SW3 (S110).

As described above, according to an example embodiment, the power of a battery 10 may be gradually supplied through the delay circuit including the precharge resistor R3 to prevent the occurrence of an overcurrent or inrush current in the initial stage of discharge of the battery 10, and along with this, the capacitance of the link capacitor 20 may be calculated using RC delay by the resistor R3 and the link capacitor 20 to provide information about the degree of aging and the replacement time of the link capacitor 20.

As described above, embodiments may provide a power supply control method for calculating a capacitance of a link capacitor functioning as a buffer while being charged and discharged between a battery of a power supply and an external load.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A control method for a power supply in which a link capacitor is connected between an external load and a power relay assembly (PRA) that includes a precharge resistor to control a power flow between a battery and the external load, the control method comprising:

initiating power flow from the battery through the precharge resistor to the link capacitor;

after the initiating of the power flow from the battery through the precharge resistor to the link capacitor, measuring a first voltage V1 across terminals of the link capacitor at a first time T1, measuring a second voltage V2 across the terminals of the link capacitor at a second time T2, and measuring a third voltage V3 across the terminals of the link capacitor at a third time T3, wherein the second time T2 is a preset time interval Δt after the first time T1, the third time T3 is the preset time interval Δt after the second time T2, and the first, second, and third times T1, T2, and T3 are selected such that (V3-V2) is less than (V2-V1;

calculating a capacitance C of the link capacitor using the first voltage V1, the second voltage V2, and the third voltage V3; and after measuring the first, second, and third voltages V1, V2, and V3, terminating the power flow from the battery through the precharge resistor to the link capacitor, wherein the capacitance C of the link capacitor is calculated using the natural logarithm (base e) of a voltage rise ratio X, a resistance R of the precharge resistor, and the preset time interval Δt according to the following equation:

$$C = -\frac{\Delta t}{(R \times \ln X)}.$$

in which the voltage rise ratio X is calculated according to the following equation:

$$X = \frac{(V3-V2)}{(V2-V1)}.$$

2. The control method as claimed in claim 1, wherein the measuring of the first voltage V1, the second voltage V2, and the third voltage V3 includes:
- after the initiating of the power flow from the battery through the precharge resistor to the link capacitor, measuring the first voltage V1 at the first time T1;
- measuring the second voltage V2 at the second time T2 after the preset time interval Δt from the first time T1; and
- measuring the third voltage V3 at the third time T3 after the preset time interval Δt from the second time T2.

3. The control method as claimed in claim 1, wherein:
the PRA includes a first main relay connected to a negative terminal of the battery; a second main relay connected to a positive terminal of the battery; and a precharge relay connected in parallel to the second main relay and in series to the precharge resistor, and the control method further comprises controlling the first main relay, the second main relay, and the precharge relay using a control unit.

4. The control method as claimed in claim 3, wherein, in the initiating of the power flow from the battery through the precharge resistor to the link capacitor, the control unit outputs a relay control signal to turn on the precharge relay.

5. The control method as claimed in claim 4, wherein, in the initiating of the power flow from the battery through the precharge resistor to the link capacitor, the control unit outputs a relay control signal to turn on the first main relay before turning on the precharge relay.

6. The control method as claimed in claim 3, wherein, in the terminating of the power flow from the battery through the precharge resistor to the link capacitor, the control unit outputs a relay control signal to turn on the second main relay.

7. The control method as claimed in claim 6, wherein, in the terminating of the power flow from the battery through the precharge resistor to the link capacitor, the control unit changes the relay control signal to turn off the precharge relay after turning on the second main relay.

8. The control method as claimed in claim 1, wherein main charge is performed simultaneously with the terminating of the power flow from the battery through the precharge resistor to the link capacitor by bypassing the precharge resistor.

9. The control method as claimed in claim 1, wherein, after the measuring of the first voltage V1, the second voltage V2, and the third voltage V3, the control method further comprises:
- measuring a fourth voltage across the terminals of the link capacitor;
- measuring a voltage of the battery; and
- determining a termination time of the power flow from the battery through the precharge resistor to the link capacitor by comparing the measured fourth voltage of the link capacitor with the measured voltage of the battery.

10. The control method as claimed in claim 9, wherein, in the determining of the termination time of the power flow from the battery through the precharge resistor to the link capacitor, a transition to the terminating of the power flow from the battery through the precharge resistor to the link capacitor is performed at a time when the measured fourth voltage of the link capacitor is equal to or greater than about 95% to about 97% of the measured voltage of the battery.

11. The control method as claimed in claim 10, wherein the measuring of the first voltage V1, the second voltage V2, and the third voltage V3 are each performed between the initiating of the power flow from the battery through the precharge resistor to the link capacitor and the terminating of the power flow from the battery through the precharge resistor to the link capacitor.

12. The control method as claimed in claim 1, wherein a control unit determines a replacement time of the link capacitor by detecting a capacitance decrease of the link capacitor, which occurs with time of use, from the calculated capacitance C of the link capacitor.

13. The control method as claimed in claim 12, wherein the control unit determines, as the replacement time of the link capacitor, a time when the calculated capacitance C of the link capacitor falls below a preset percentage of an initial capacitance of the link capacitor, and the control unit generates an alarm corresponding to the replacement time.

* * * * *